United States Patent
Tabata et al.

(12)

(10) Patent No.: US 7,722,257 B2
(45) Date of Patent: May 25, 2010

(54) ROLLER BEARING CAGE AND TAPERED ROLLER BEARING

(75) Inventors: Masahiro Tabata, Kashiwara (JP); Takanori Kurokawa, Kashiwara (JP)

(73) Assignee: JTEKT Corporation, Osaka-shi, Osaka (JP)

( * ) Notice: Subject to any disclaimer, the term of this patent is extended or adjusted under 35 U.S.C. 154(b) by 373 days.

(21) Appl. No.: 11/727,928

(22) Filed: Mar. 29, 2007

(65) Prior Publication Data

US 2007/0230852 A1 Oct. 4, 2007

(30) Foreign Application Priority Data

Mar. 30, 2006 (JP) .......................... P2006-094608

(51) Int. Cl.
*F16C 33/46* (2006.01)
(52) U.S. Cl. .................. 384/571; 384/572; 384/580
(58) Field of Classification Search .............. 384/571, 384/572, 576, 580
See application file for complete search history.

(56) References Cited

U.S. PATENT DOCUMENTS

| 2,946,633 | A | | 7/1960 | Gothberg | |
|---|---|---|---|---|---|
| 3,477,773 | A | * | 11/1969 | Altson | 384/576 |
| 4,288,129 | A | * | 9/1981 | Ryanen | 384/576 |
| 4,317,601 | A | * | 3/1982 | Faigley, Jr. | 384/576 |
| 4,462,643 | A | * | 7/1984 | Gilbert et al. | 384/576 |
| 4,541,743 | A | * | 9/1985 | Hatano | 384/576 |
| 4,707,152 | A | * | 11/1987 | Neese | 384/572 |
| 6,022,148 | A | * | 2/2000 | Back et al. | 384/576 |
| 6,135,643 | A | | 10/2000 | Hattori et al. | |

FOREIGN PATENT DOCUMENTS

| EP | 0 171 096 A1 | 2/1986 |
|---|---|---|
| EP | 1 473 474 A2 | 11/2004 |
| GB | 271865 | 11/1927 |
| JP | 1-85521 | 6/1989 |
| JP | 11-044322 | 2/1999 |
| JP | 2003-254338 | 9/2003 |

OTHER PUBLICATIONS

European Search Report dated Feb. 1, 2008.

* cited by examiner

*Primary Examiner*—Thomas R Hannon
(74) *Attorney, Agent, or Firm*—McGinn IP Law Group, PLLC

(57) ABSTRACT

A roller bearing cage is made of a resin and has a tapered tubular shape as a whole. In the roller bearing cage, tapered rollers are forcibly fitted to pockets while elastically deforming pillar portions at a small-diameter annular portion side. A stress alleviating portion is provided on at least an outer circumferential side of an end of the pillar portion at the small-diameter annular portion side so that a portion of the pillar portion from a crossing portion between the pillar portion and the small-diameter annular portion to a side of the large-diameter annular portion is linearly cut, thereby alleviating the stress occurring in the pillar portion when the tapered roller is forcibly fitted to the pocket.

12 Claims, 7 Drawing Sheets

ROLLER BEARING CAGE AND TAPERED ROLLER BEARING

BACKGROUND OF THE INVENTION

The present invention relates to a roller bearing cage that is made of a resin and is used for a roller bearing and a tapered roller bearing that uses the roller bearing cage.

A cage, which is incorporated in a tapered roller bearing used in a transmission device or a differential device of a vehicle, an axel of a railroad vehicle or an industrial machine, or a tapered roller bearing of a hub unit bearing disclosed in Patent Document 1, is made of a resin material that has smaller weight than a metal material and excellent productivity and economical efficiency. Generally, the cage that is made of the resin material includes a large-diameter annular portion and a small-diameter annular portion that are concentrically disposed on opposite sides of the cage in an axial direction, and a plurality of pillar portions that extend between the large-diameter annular portion and the small-diameter annular portion at a plurality of locations in a circumferential direction. In this cage, pockets are defined between the pillar portions. Meanwhile, in an assembling process of the roller bearing, for example, as shown in FIG. 7, after tapered rollers are inserted in the pockets of the cage, an inner ring member is pressed from an axial direction, and the tapered rollers are mounted in the pockets. At this time, the tapered rollers are forcibly fitted to the pockets by elastic deformation of the resin.

Patent Document 1; JP-A-11-044322

In the assembly process of the roller bearing, when the inner ring member is pressed and the tapered rollers are forcibly fitted to the pockets, an edge portion 60 of the tapered roller at an boundary between an outer circumferential portion and an end surface of the tapered roller at the small-diameter annular portion side presses and elastically deforms the small-diameter annular portion-side end 61 of the pillar portion (see FIG. 6A).

Meanwhile, in the tapered roller bearing that is used in the transmission device or the differential device of the vehicle, the cage comes into contact with lubricating oil, such as gear oil, which contains additives such as extreme-pressure additives, and thus it is required to use a resin having an oil resistance. Accordingly, the resin that forms the cage needs to have a high heat resistance and oil resistance. However, when a reinforcing material is mixed in the resin that has physical properties such as the heat resistance or oil resistance, the resin generally has high rigidity. When the resin having high rigidity is used, the strong stress may be applied to the pillar portions due to elastic deformation by the tapered roller, and a portion of the pillar portions may be damaged or cracked.

The above-described problems may occur when a rib is provided on the small diameter side of the inner ring member. In particular, as shown in FIGS. 1 and 7, in a tapered roller bearing where an outer ring angle, which is an angle of the outer ring with respect to an inner circumferential raceway surface, which corresponds to an angle $\alpha 2$ in FIGS. 1 and 7, is 20° or more, for example, in a range of not less than 20 and less than 30°, and a roller angle, which corresponds to an angle $\gamma 1$ in FIGS. 1 and 7, is in a range of 7 to 10°, when the rollers are mounted in the cage and is assembled in the inner ring member, due to the rib provided on the small diameter side of the inner ring member, movement amount at the small diameter side of the roller that is pushed to the outside of the diameter direction is increased as compared with the case where the outer ring angle is less than 20° and the roller angle is in a range of 5 to 7°. As a result, the stress, which is applied to an end of the pillar portion at the small-diameter annular portion side, increases.

In order to solve the above-described problems, in regards to a material, an amount of a reinforcing material mixed in the resin material is reduced so as to improve flexibility of the resin. In this case, the strength or heat resistance may be lowered. Further, in regards to a shape, as shown in FIG. 6B, corners 72 of the pillar portions 70 and the small-diameter annular portion 71 on which the stress focuses are formed in a circular bore shape. In this case, since a mold structure for forming the cage becomes complicated, it becomes difficult to manufacture the cage.

SUMMARY OF THE INVENTION

The invention has been made to solve the above-described problems inherent in the related art. It is an object of the invention to provide a roller bearing cage that are capable of preventing a pillar portion from being damaged or cracked at the time of a tapered roller being forcibly fitted to a pocket, satisfying required physical properties, such as strength, a heat resistance, and an oil resistance, and being easily manufactured, and a tapered roller bearing using the roller bearing cage.

In order to achieve the above-described object, the following technical means is used in the invention.

According to an aspect of the invention, a roller bearing cage made of a resin and having a tapered tubular shape as a whole, the roller bearing cage includes:

a large-diameter annular portion and a small-diameter annular portion that are concentrically arranged in an axial direction;

a plurality of pillar portions that extend between the large-diameter annular portion and the small-diameter annular portion at a plurality of positions in a circumferential direction; and pockets that are defined between the pillar portions, tapered rollers being forcibly fitted to the pockets while elastically deforming the pillar portions at a side of the small-diameter annular portion, a stress alleviating portion provided on at least an outer circumferential side of an end of the pillar portion at a side of the small-diameter annular portion for alleviating stress occurring in the pillar portion when the tapered roller is forcibly fitted to the pocket, wherein the stress alleviating portion is formed so that a portion of the pillar portion from a crossing portion between the pillar portion and the small-diameter annular portion to a side of the large-diameter annular portion is linearly cut.

In the roller bearing cage according to the aspect of the invention, when the tapered roller is forcibly fitted to the pocket, the stress that is applied to the pillar portion is alleviated by the stress alleviating portion. Therefore, the strong stress is not applied to the pillar portions in the assembling process, and the cage can be prevented from being cracked. Further, since the material forming the cage does not need to have flexibility so as to alleviate the stress, a resin having high rigidity can be used. In addition, it is possible to use a resin capable of satisfying required physical properties, such as a heat resistance and an oil resistance. Furthermore, since the stress alleviating portion is formed so that a portion of the pillar portion from a crossing portion between the pillar portion and the small-diameter annular portion to a side of the large-diameter annular portion is linearly cut, the cage can be easily manufactured without requiring a complicated mold structure.

Preferably, the stress alleviating portions each are cut in a shape tapered from the crossing portion to the side of the large-diameter annular portion.

In this case, a structure of a mold for forming the stress alleviating portion can be simplified.

Preferably, the stress alleviating portions are provided on opposite sides of all the pillar portions in a circumferential direction.

In this case, since the tapered rollers are smoothly mounted by the cage, the tapered rollers can be reliably assembled.

Preferably, in the invention in which the stress alleviating portions are provided on opposite sides of all the pillar portions in a circumferential direction, at least a portion of the pillar portions at the small-diameter annular portion side is formed to have a trapezoidal section in a circumferential direction, and a circumferential minimum width of a portion where the stress alleviating portions are provided is equal to or larger than a circumferential width of an inner circumferential surface of the pillar portion.

In this case, even when the stress alleviating portions are provided on both sides of all the pillar portions in a circumferential direction, the intensity of the pillar portions can be ensured.

According to another aspect of the invention, a tapered roller bearing includes an inner ring member, an outer ring member, a plurality of tapered rollers that are interposed between the inner ring member and the outer ring member, and a roller bearing cage that rotatably retains the plurality of tapered rollers. The roller bearing cage is the above-described roller bearing cage according to the aspect of the invention.

According to the tapered roller bearing according to another aspect of the invention, the tapered roller bearing uses a cage that can be prevented from being damaged or cracked, can satisfy required physical properties, such as intensity, a heat resistance, and an oil resistance, and can be easily manufactured. Therefore, the tapered roller bearing can be easily manufactured, and has high durability.

According to the aspects of the invention, the stress alleviating portions are provided to alleviate the stress applied to the pillar portions, and each of the stress alleviating portions is composed of a cutout portion that linearly extends from the crossing portion between the pillar portion and the small-diameter annular portion to the side of the large-diameter annular portion. Therefore, the roller bearing cage can be easily manufactured which can prevent the pillar portions from being damaged or cracked when the tapered rollers are forcibly fitted to the pockets and satisfy required physical properties, such as the intensity, the heat resistance, and the oil resistance.

BRIEF DESCRIPTION OF THE DRAWINGS

FIG. 6A is a diagram illustrating a state where a tapered roller is forcibly fitted to a pocket, and FIG. 6B is a cross-sectional view of a cage where cutout portions are provided in a crossing portion in order to release an edge of a tapered roller.

DETAILED DESCRIPTION OF PREFERRED EMBODIMENTS

Figure 1:
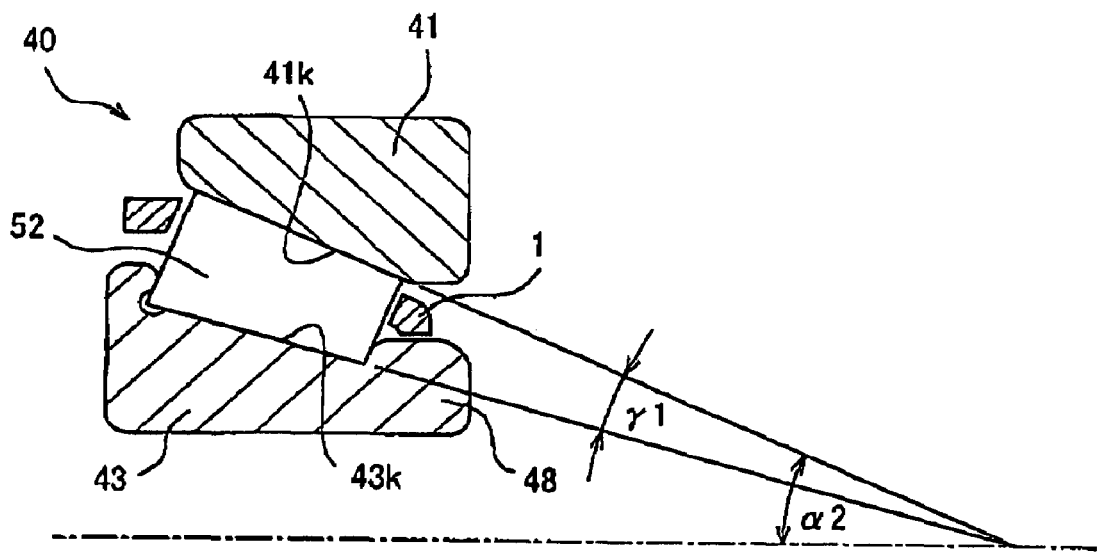
FIG. 1 is a cross-sectional view illustrating a main portion of a tapered roller bearing according to a first embodiment of the invention.

Hereinafter, the preferred embodiments of the invention will be described with reference to the accompanying drawings. FIG. 1 is a diagram illustrating a tapered roller bearing 40 according to a first embodiment of the invention in which a roller bearing cage (hereinafter, referred to as cage) 1 is used. A tapered roller bearing 40 according to this embodiment includes a single outer ring member 41 that is provided with an outer ring raceway 41k whose size is increased from one side to the other side, an inner ring member 43 that is provided with an inner ring raceway 43k whose size is increased from one side to the other side, a plurality of tapered rollers 52 that are interposed rotatably between the inner ring raceway 43k and the outer ring raceway 41k facing each other, and a cage 1 that retains the plurality of tapered rollers 52 at predetermined intervals in a circumferential direction.

Figure 2:
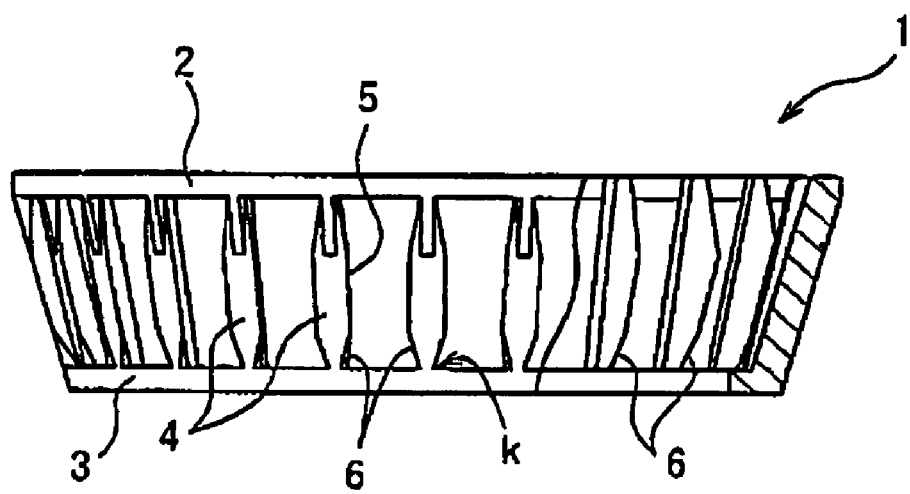
FIG. 2 is a lateral view illustrating a cage.
Figure 3:
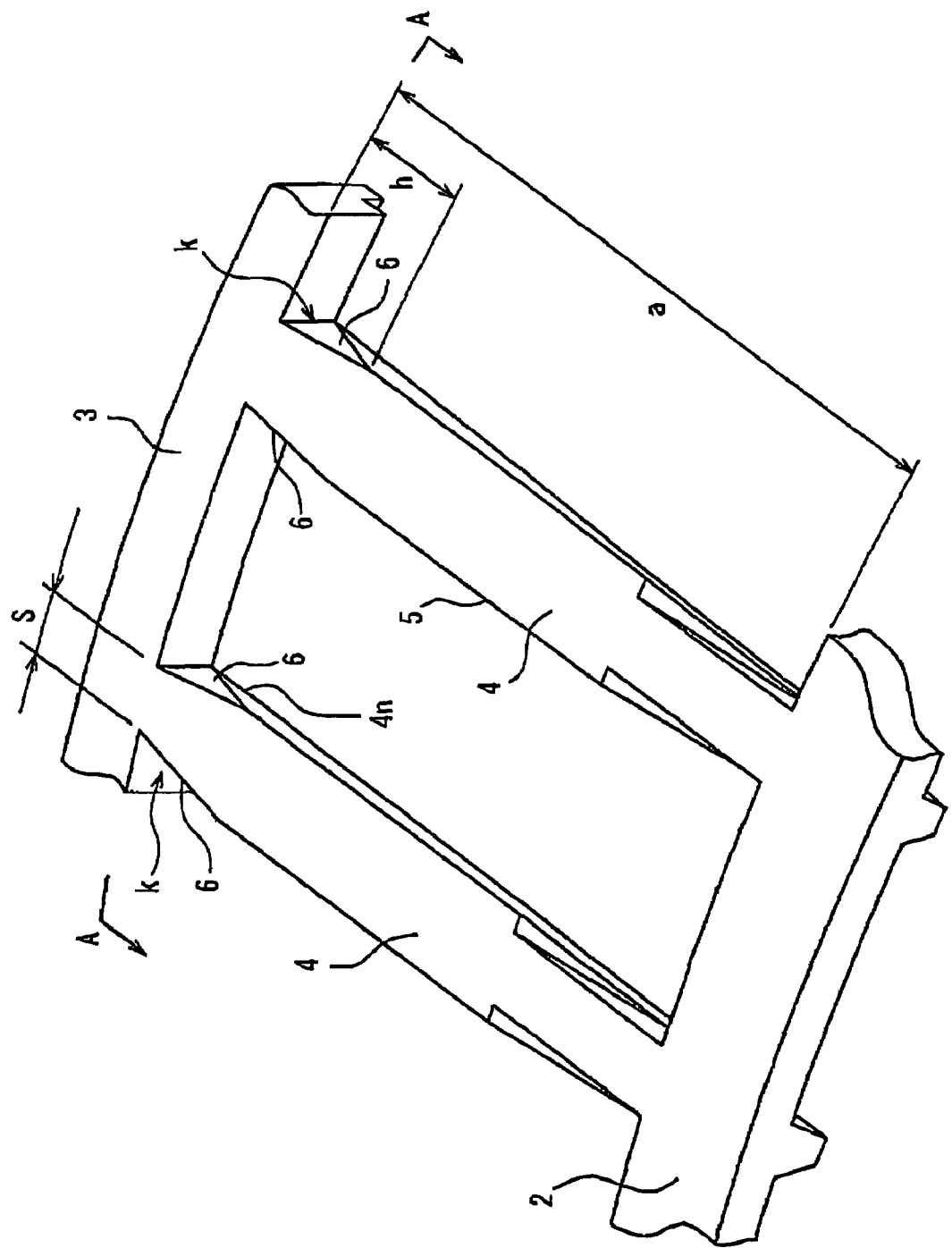
FIG. 3 is an enlarged perspective view illustrating a main portion of a cage.

As shown in FIG. 2, the cage 1 includes a large-diameter annular portion 2 and a small-diameter annular portion 3 that are concentrically disposed on opposite sides of the cage in an axial direction, a plurality of pillar portions 4 that extend between the large-diameter annular portion 2 and the small-diameter annular portion 3 at a plurality of locations in a circumferential direction, and pockets 5 that are defined between the pillar portions 4 and have the tapered rollers 52 mounted therein. The entire cage 1 is formed in a tapered tubular shape. The pillar portions 4 at the side of the small-diameter annular portion 3 are formed such that sections thereof in the circumferential direction have approximately trapezoidal shapes as a whole, and stress alleviating portions 6 are provided on the outer circumferential sides of the ends of the pillar portions 4 at the side of the small-diameter annular portion 3. The stress alleviating portions 6 are provided on both sides of all the pillar portions 4 in the circumferential direction and alleviate the stress that occurs in the pillar portions 4 when the tapered rollers 52 are forcibly fitted to the pockets 5. As shown in FIG. 3, the stress alleviating portion 6 is cut in a linearly tapered shape such that a size of the stress alleviating portion 6 is decreased from the crossing portion k between the pillar portion 4 and the small-diameter annular portion 3 to the side of the large-diameter annular portion 2, and has a simple shape so as to linearly remove a portion of the pillar portion 4.

The cage 1 is made of a resin material. For example, the cage 1 is made of a material that is obtained by mixing a glass fiber in aromatic polyamide where a terephthalic acid, an adipic acid, and diamine is used as a monomer, in a range of 5 to 30 wt %, more preferably, in a range of 5 to 20 wt %. If this material is used, it is possible to fore the cage 1 that has high rigidity and satisfies required physical properties, such as a heat resistance, an oil resistance and the like. Examples of the resin material that is used for the cage 1 may include polyamide (polyamide 46, polyamide 66, and aromatic polyamide), polyphenylene sulfide, polyetheretherketone, polyacetal, polyethersulfone, polyamideimide, polyimide, polyethernitrile, polyphenylsulfone, polyetherimide, polyethylene terephthalate, polybuthylene terephthalate, polycarbonate, or the like.

Further, examples of a reinforcing fiber that is mixed in the resin may include a glass fiber, a carbon fiber, fiber-shaped wollastonite, a silicon carbide fiber, a boron fiber, an alumina fiber, an Si—Ti—C—O fiber, a metal fiber (copper, steel, stainless steel, or the like), an aromatic polyamide fiber, potassium titanate whisker, graphite whisker, silicon carbide whisker, silicon nitride whisker, alumina whisker, or the like. These reinforcing fibers may be mixed in another resin having low rigidity so as to increase the rigidity of the material. However, the resins or reinforcing fibers are not limited to the above-described examples.

Figure 4:
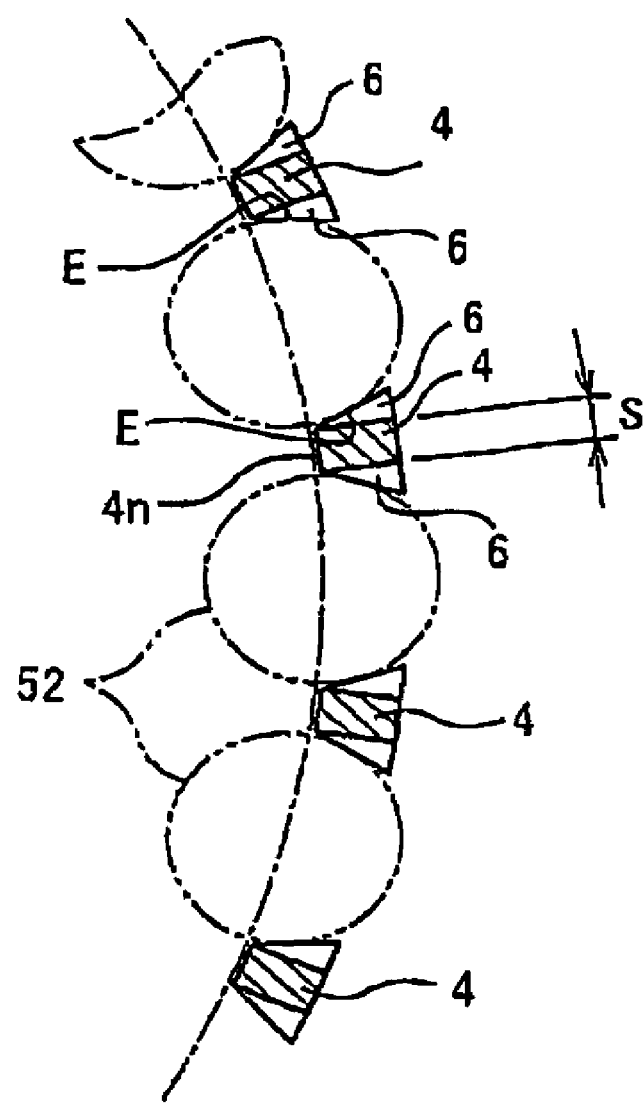
FIG. 4 is a cross-sectional view taken along the line A-A of FIG. 3.

In the assembly process of the tapered roller bearing 40, when the inner ring member 43 is pressed and the tapered rollers 52 are mounted respectively in the pockets 5, the tapered rollers 52 are forcibly fitted to the pockets 5. At this time, as shown in FIG. 4, an edge portion E of the tapered roller 52 is released by the stress alleviating portion 6 that is provided in the pillar portion 4, and the strong stress that would be applied to the pillar portion 4 is alleviated. Further, the axial range h (see FIG. 3) where the stress alleviating portion 6 is formed becomes a range of 2 (a-b) from the crossing portion k, when the axial length of the pocket 5 is defined as a and the axial length of the tapered roller 52 is defined as b. As a result, it is possible to surely release the edge portion E of the tapered roller 52. Further, the circumferential minimum width s of the portion where the stress alleviating portion 6 is provided is equal to or larger than the circumferential width of the inner circumferential surface 4n of the pillar portion 4. Further, the circumferential minimum width of the stress alleviating portion 6 according to this embodiment is in a range of 0.15 to 1.10 mm. By setting the circumferential width s in the range of 0.15 to 1.10 mm, the strength of the pillar portion 4 can be maintained.

In the cage 1 according to this embodiment, when the tapered roller 52 is forcibly fitted to the pocket 5, the stress applied to the pillar portion 4 can be alleviated by the stress alleviating portion 6. Therefore, in the assembling process, the strong stress is not applied to the pillar portions 4, and thus the cage 1 can be prevented from being cracked due to the stress. Further, a material that forms the cage 1 does not need to have flexibility in order to alleviate the stress. Therefore, when the cage 1 is formed, a resin having high rigidity can be used. In addition, it is possible to use a resin that is capable of satisfying required physical properties, such as a heat resistance and an oil resistance. Further, since the stress alleviating portion 6 includes a cutout portion that linearly extends toward the large-diameter annular portion 2 from the crossing portion k, the cage 1 can be easily manufactured without requiring a complicated mold structure. In addition, since the stress alleviating portions 6 are provided with respect to all the pillar portions 4, the tapered rollers 52 can be smoothly mounted in the cage 1, and assembly performance of the tapered roller bearing 40 can be improved. Further, the tapered roller bearing 40 uses the cage 1 that can be prevented from being damaged or cracked and can satisfy required physical properties, such as strength, a heat resistance, and an oil resistance. Therefore, the tapered roller bearing 40 has high durability.

Figure 5:
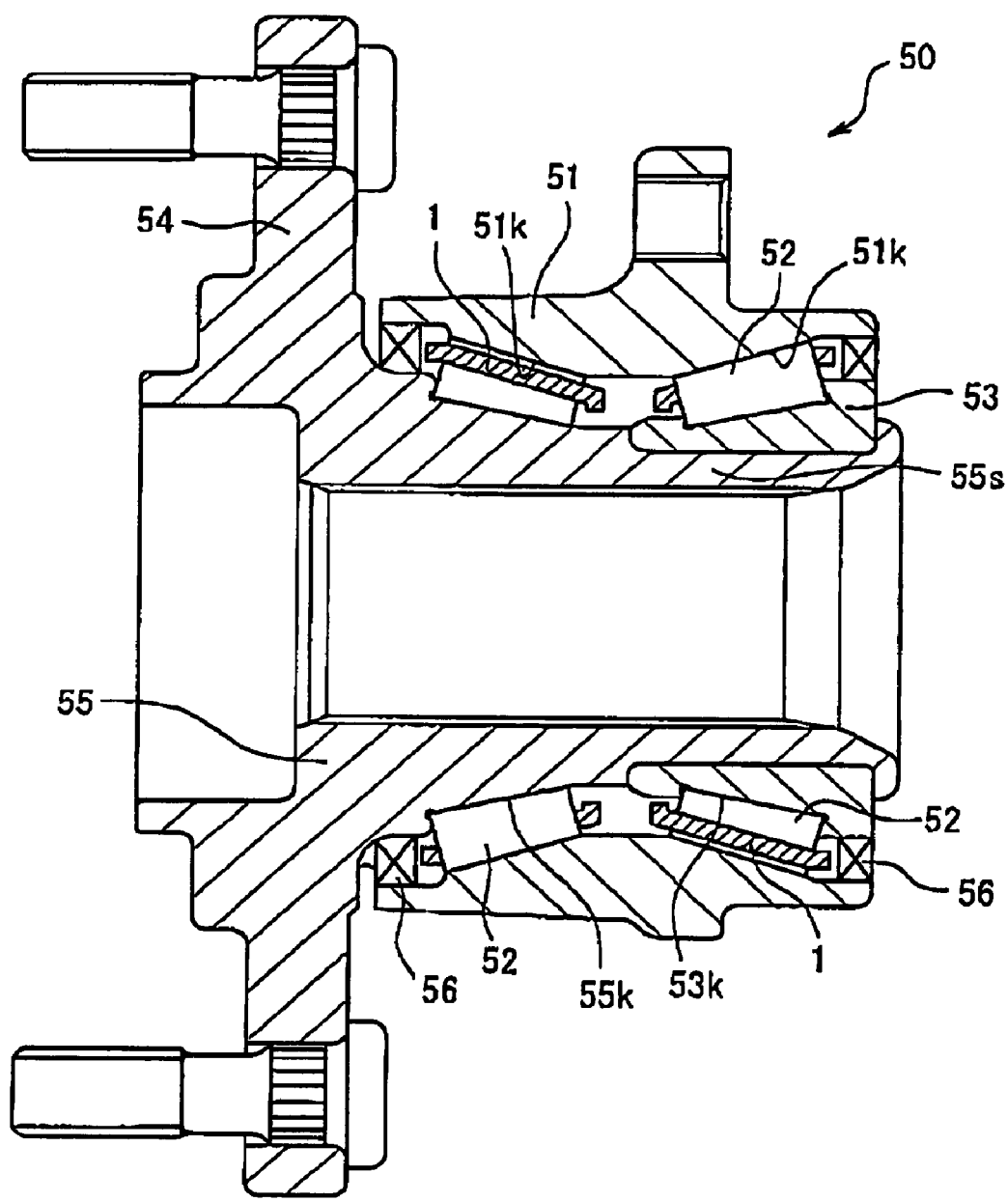
FIG. 5 is a cross-sectional view illustrating a rolling bearing device that is a tapered roller bearing according to a second embodiment of the invention.
Figure 6A:
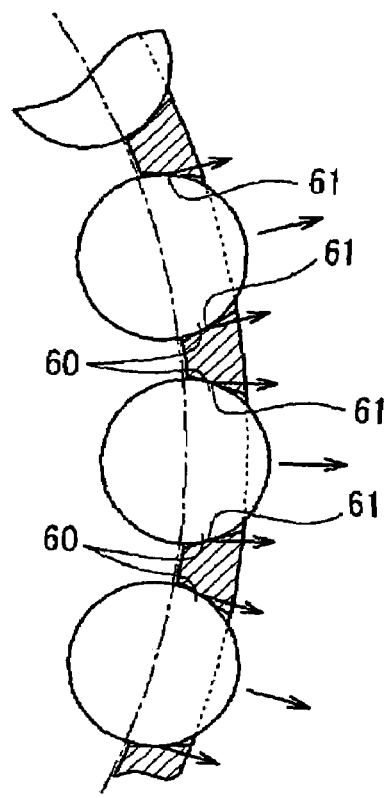
FIGS. 6A and 6B are diagrams illustrating the related art.
Figure 6B:
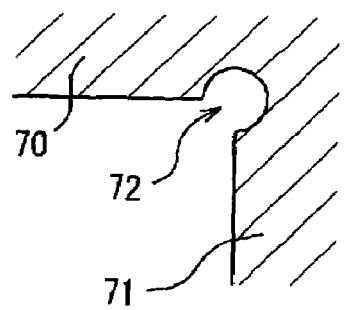
Figure 7:
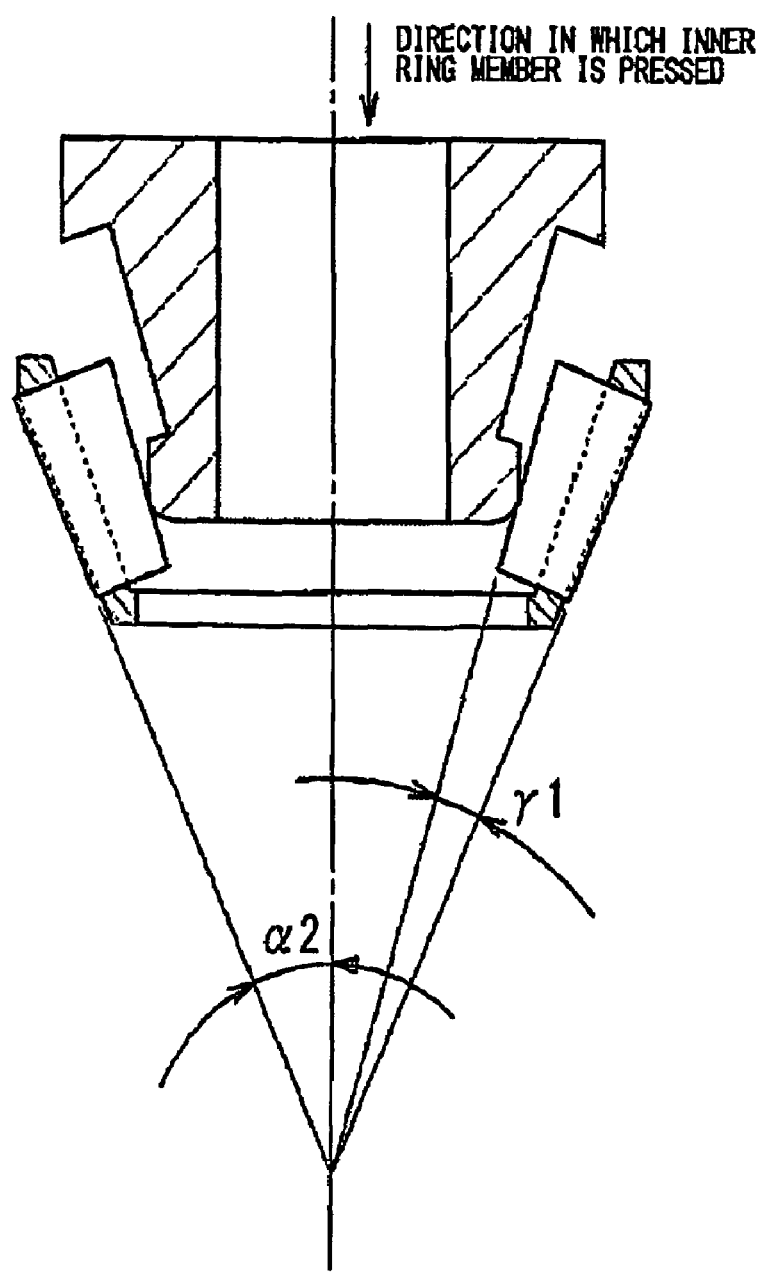
FIG. 7 is a schematic diagram illustrating an assembling state of a tapered roller bearing.

FIG. 5 is a diagram illustrating a tapered roller bearing according to a second embodiment of the invention where the cage 1 is used. The tapered roller bearing according to this embodiment is constructed as a rolling bearing device 50. The rolling bearing device 50 includes a single outer ring member 51 that is provided with a pair of outer ring raceways 51k whose sizes are increased from the central portion of the outer ring member 51 to opposite end sides thereof in the axial direction, a hub ring 55 that has a flange 54 at one end side of the hub ring 55 in the axial direction and is provided with an inner ring raceway 55k, an inner ring member 53 that is fitted around a small-diameter portion 55s of the hub ring 55 and is provided with an inner ring raceway 53k, a plurality of tapered rollers 52 that are rotatably disposed on inner and outer ring raceway surfaces facing each other, a cage 1 that retains the tapered rollers 52 at predetermined gaps in a circumferential direction, and a sealing member 56. Among them, the inner ring member 53 is caulked by a caulking portion of the end of the hub ring 55 in the axial direction, and is fixed in a state where one end face of the inner ring member 53 comes into contact with a stepped surface that is formed on an inner end of the small-diameter portion 55s.

The cage 1 is used in the rolling bearing device 50. The cage 1 has the same shape as the cage that is used in the above-described tapered roller bearing 40 according to the first embodiment, and is provided with the stress alleviating portions. As a result, the assembly performance of the rolling bearing device 50 can be improved. Further, the rolling bearing device 50 uses the cage 1 that can be prevented from being damaged or cracked and satisfy required physical properties, such as strength, a heat resistance, and an oil resistance. Therefore, rolling bearing device 50 has high durability.

The invention is not limited to the above-described embodiments. The stress alleviating portion of the pillar portion may have other shapes, for example, a circumferentially concaved shape. For example, in the above-described embodiments, the stress alleviating portion is constructed to be cut in a linearly tapered shape. However, instead of the linearly tapered shape as in the above-described embodiments, the surface that extends from the crossing portion to the side of the large-diameter annular portion may be slightly curved.

Further, the shapes or sizes of the pillar portion, the large-diameter annular portion, and the small-diameter annular portion may be properly changed according to the structure of the roller bearing.

What is claimed is:

1. A roller bearing cage comprising a resin and having a tapered tubular shape as a whole, the roller bearing cage comprising:
   a large-diameter annular portion and a small-diameter annular portion that are concentrically arranged in an axial direction;
   a plurality of pillar portions that extend between the large-diameter annular portion and the small-diameter annular portion at a plurality of positions in a circumferential direction;
   pockets that are defined between the pillar portions, tapered rollers being forcibly fitted to the pockets while elastically deforming the pillar portions at a side of the small-diameter annular portion; and
   stress alleviating portions provided on at least an outer circumferential side of an end of the pillar portion at a side of the small-diameter annular portion for alleviating stress occurring in the pillar portion when a tapered roller is forcibly fitted to a pocket,
   wherein the stress alleviating portions are provided on both sides of the pillar portions in the circumferential direction,
   wherein the stress alleviating portions are formed so that a portion of the pillar portion from a crossing portion between the pillar portion and the small-diameter annular portion to a side of the large-diameter annular portion is linearly cut, and
   wherein a diameter at an edge portion of a small-end portion is less than a distance between adjacent crossing portions between the pillar portions and the small-diameter portions.

2. The roller bearing cage according to claim 1, wherein the stress alleviating portions are formed in a triangular shape that tapers from the crossing portion towards the side of the large-diameter annular portion.

3. The roller bearing cage according to claim 1, wherein a plurality of the stress alleviating portions are provided on opposite sides of all the pillar portions in a circumferential direction.

4. The roller bearing cage according to claim 3, wherein:
at least a portion of the plurality of pillar portions at the small-diameter annular portion side is formed to have a trapezoidal section in a circumferential direction; and
a minimum width of a portion where the stress alleviating portions are provided is equal to or larger than a width of an inner surface of the plurality of pillar portions.

5. The roller bearing cage according to claim 1, wherein a circumferential distance between the adjacent pillars at the small-diameter annular portion is shortest at an inner circumferential surface of the pillar portion.

6. The roller bearing cage according to claim 1, wherein an axial range where the stress alleviating portions are formed becomes a range of 2 (A-B) from the crossing portion, where A represents an axial length of the pocket and B represents an axial length of the tapered roller.

7. A tapered roller bearing comprising:
an inner ring member;
an outer ring member;
a plurality of tapered rollers that are interposed between the inner ring member and the outer ring member; and
a roller bearing cage comprising a resin and having a tapered tubular shape as a whole that rotatably retains the plurality of tapered rollers,
wherein the roller bearing cage comprises:
a large-diameter annular portion and a small-diameter annular portion that are concentrically arranged in an axial direction;
a plurality of pillar portions that extend between the large-diameter annular portion and the small-diameter annular portion at a plurality of positions in a circumferential direction;
pockets that are defined between the pillar portions, the tapered rollers being forcibly fitted to the pockets while elastically deforming the pillar portions at a side of the small-diameter annular portion; and
stress alleviating portions provided on at least an outer circumferential side of an end of the pillar portion at a side of the small-diameter annular portion for alleviating stress occurring in the pillar portion when the tapered roller is forcibly fitted to the pocket,
wherein the stress alleviating portions are provided on both sides of the pillar portions in the circumferential direction,
wherein the stress alleviating portions are is formed so that a portion of the pillar portion from a crossing portion between the pillar portion and the small-diameter annular portion to a side of the large-diameter annular portion is linearly cut, and
wherein a diameter at an edge portion of a small-end portion is less than a distance between adjacent crossing portions between the pillar portions and the small-diameter portions.

8. The tapered roller bearing according to claim 7, wherein the stress alleviating portions are is formed in a triangular shape that tapers from the crossing portion towards the side of the large-diameter annular portion.

9. The tapered roller bearing according to claim 7, wherein a plurality of the stress alleviating portions are provided on opposite sides of all the pillar portions in a circumferential direction.

10. The tapered roller bearing according to claim 9, wherein
at least a portion of the plurality of pillar portions at the small-diameter annular portion side is formed to have a trapezoidal section in a circumferential direction, and
a minimum width of a portion where the stress alleviating portions are provided is equal to or larger than a width of an inner surface of the plurality of pillar portions.

11. The roller bearing cage according to claim 7, wherein a circumferential distance between the adjacent pillars at the small-diameter annular portion is shortest at an inner circumferential surface of the pillar portion.

12. The roller bearing cage according to claim 7, wherein an axial range where the stress alleviating portions are formed becomes a range of 2 (A-B) from the crossing portion, where A represents an axial length of the pocket and B represents an axial length of the tapered roller.

* * * * *